United States Patent [19]

Severns, Jr. et al.

[11] E Re. 29,547

[45] Reissued Feb. 21, 1978

[54] NICKEL SILICON AND REFRACTORY METAL ALLOY

[75] Inventors: William Harrison Severns, Jr., Wilmington, Del.; Gaylord Darrel Smith, Mountainside, N.J.

[73] Assignee: E. I. Du Pont de Nemours and Company, Wilmington, Del.

[21] Appl. No.: 498,229

[22] Filed: Aug. 16, 1974

Related U.S. Patent Documents

Reissue of:

[64] Patent No.: 3,361,560
Issued: Jan. 2, 1968
Appl. No.: 543,651
Filed: Apr. 19, 1966

U.S. Applications:

[63] Continuation-in-part of Ser. No. 269,818, April 1, 1963, Pat. No. 3,257,178.

[51] Int. Cl.[2] ..... C22C 19/00

[52] U.S. Cl. ..... 148/32; 75/170; 75/171; 75/176

[58] Field of Search ..... 75/170, 171, 176; 148/32, 32.5

[56] References Cited

U.S. PATENT DOCUMENTS

| | | | |
|---|---|---|---|
| 1,465,547 | 8/1923 | Driver | 75/171 |
| 1,544,037 | 6/1925 | Rosencrantz | 75/171 |
| 1,769,229 | 7/1930 | Mandell | 75/171 |
| 2,247,643 | 7/1941 | Rohn | 75/171 |
| 2,923,621 | 2/1960 | Hoppin | 75/171 |
| 3,180,012 | 4/1965 | Smith | 75/176 |
| 3,254,970 | 6/1966 | Dittrich | 75/170 |
| 3,410,732 | 11/1968 | Smith | 75/171 |

OTHER PUBLICATIONS

Structure of Metals and Alloys, pp. 236–239, by Hume Rothery and Raynor, Institute of Metals, 1962.

*Primary Examiner*—R. Dean

[57] ABSTRACT

An alloy for use as a protective coating for metal bodies is composed of a substantial amount of metal A (molybdenum or tungsten or both), a substantial amount of metal B (cobalt or nickel or both), and silicon; the sum of the amounts of metals A and B being at least 60 atomic percent of the alloy; the amount of silicon and the relative amounts of metals A and B being such as to provide 30-85 volume percent of the alloy in the Laves phase, the Laves phase being distributed in a relatively soft matrix of the remaining 70-15 volume percent of the alloy.

20 Claims, 3 Drawing Figures

NICKEL SILICON AND REFRACTORY METAL ALLOY

Matter enclosed in heavy brackets [ ] appears in the original patent but forms no part of this reissue specification; matter printed in italics indicates the additions made by reissue.

This application is *a reissue of U.S. Pat. 3,361,560, which was* a continuation-in-part of our copending application Ser. No. 269,818, which was filed Apr. 1, 1963, now Patent 3,257,178.

This invention relates to novel alloys useful as protective coatings for metal bodies, which alloys exhibit outstanding resistance to deterioration from one or more of wear, abrasion, oxidation, and corrosion. More particularly, the invention relates to novel alloys constituted essentially of 30–85 volume percent Laves phase comprising at least two metals in its elemental composition present in 70–15 volume percent of a softer matrix formed of the same elemental components as said Laves phase, said matrix being in quasi equilibrium with said Laves phase. Specifically, the alloy of this invention consists essentially of silicon and at least 60 atomic percent of at least two heavy transition elements selected from the group consisting of molybdenum, cobalt, tungsten, nickel and chromium; wherein 30–85 volume percent of the alloy is present as Laves phase in a matrix composed of the remaining 70–15 volume percent of the alloy, the matrix being softer than the Laves phase. For simplicity, hereinafter, atom percent will be abbreviated by a/o, weight percent by w/o, and volume percent by v/o.

The term "Laves phase" as used herein and in the claims means one or more metallographic constituents of an alloy that have the $C_{14}$ (hexagonal), $C_{15}$ (cubic), or $C_{30}$ (hexagonal) crystal structure described in "International Tables for X-Ray Crystallography" by N. F. M. Henry and K. Lonsdale, International Union of Crystallography, Kynoch Press, Birmingham, England (1952). Prototypes of the Laves phase crystal structures are, respectively, $MgZn_2$, $MgCu_2$, and $MgNi_2$.

Such phase structures, named after Dr. Fritz Laves, who pioneered their study, are unique crystal structures that permit the most complete occupation of space by assemblages of two sizes of spheres. Fundamentally, Laves phase can be represented by the stoichiometric composition $AB_2$, the large atoms (A) occupying certain sets of crystallographic sites and the small atoms (B) occupying other sites, in which the ratio of atomic radii A:B is in a range of about from 1.05 to 1.68. The chemical natures of the component atoms and the electron-atom ratio of a given composition are factors in determining which of the three types of Laves phase will form or the nonexistence of a Laves phase where the size factor is favorable.

Laves phases occur as intermediate phases in numerous alloy systems. Laves phases generally have a homogeneity range, i.e., they can have any of a range of elemental compositions while maintaining their characteristic crystal structure. The atom ratio B:A may range from slightly less to slightly more than 2, possibly the result of some vacant sites in the crystal structure. Also, more than one kind of atom can occupy the large-atom sites, the small-atom sites, or both. Such Laves phases can be represented stoichiometrically by the formula $(A_{1-x}C_x)(B_{1-y}D_y)_2$, where C represents the atoms of one or more kinds that substitute for the large atoms, D represents the atoms of one or more kinds that substitute for the small atoms of the binary Laves structure $AB_2$, and the quantities x and y have values in the range zero to one. A Laves phase can contain atoms of as many as five or six or even more elements in its crystal structure.

The bulk of the numerous published investigations of Laves phases have been primarily concerned with their crystal structures and the atomic properties and relationships favorable to their formation. Such phases are recognized in the prior art as generally hard intermetallic compounds which, depending on their elemental compositions, may also exhibit good oxidation or corrosion resistance. Nevertheless, the valuable properties of Laves phases of the various elemental compositions and useful applications thereof in materials of construction have received little recognition since alloys consisting of such phases are invariably brittle and difficult to work.

The process of using the novel alloy to coat metal bases involves the steps of (a) forming the alloy consisting essentially of from about 30–85 v/o Laves phase and 70–15 v/o of a matrix, said alloy when in contact with the metal base to be coated having an incipient melting point below the melting point of said metal base, (b) reducing the coating alloy to a powder, (c) depositing the powder on the base metal, (d) melting at least a part of the deposit of powdered alloy by heating in a nonoxidizing atmosphere until the melt wets the unmelted deposit and the underlying surface of the metal body, and (e) cooling the formed article at a rate that leaves the alloy coating with a matrix softer than the Laves phase therein.

The term "base metal" as used herein and in the claims with a designated metal preceding it, such as, for example, "ferrous" or "nickel," means a substance having metallic properties containing the designated metal in a predominant amount, preferably at least 50 w/o. The term "heavy transition metal" as used herein means a metal selected from the group consisting of Co and Ni of Group VIII; Mn and Re of Group VII-B; Cr, Mo, W, and U of Group VI-B; Ti, Zr, Hf, and Th of Group IV-B; and Sc, Y, La, and Ce of Group III-B of the "Fundamental Chemistry," New York, N.Y., John Wiley & Sons, 2nd Ed. (1947). The preferred heavy transition metals are Co and Ni of Group VIII and Cr, Mo and W of Group VI.

It should be pointed out that when metal articles are coated so that the surface layer of the coating is of the described alloy system containing the specified metals, the atomic radii ratio of said metals permits the formation of Laves phase. The inclusion of the preferred heavy transition metals in the alloy coating has been found to provide, when an appreciable content of the alloy is present in the surface layer of the coating as Laves phase, a surprising combination of benefits to a metal base including improved wear, abrasion, and corrosion resistance; and greater service life at elevated temperatures. Many of the Laves phases of such alloy systems melt at a temperature several hundred degrees higher than the metal base itself. The inclusion of silicon in the alloy coating having the novel structure of the invention is particularly preferred since this element often confers outstanding oxidation and corrosion resistance to the coated article and serves as well to stabilize the Laves phase of the alloy system present in the coating.

As stated previously, improved articles are obtained when the Laves phase in the surface layer of the protective metal coating is in a matrix formed of the same alloy system as the Laves phase and when the matrix is softer than the Laves phase. In accordance with the invention, the relative proportions of Laves phase to softer matrix in the surface layer of the coating is to be maintained in a range of from 30–85 v/o Laves phase and from 70–15 v/o softer matrix with the Laves phase content at no level in the surface layer exceeding 85 v/o. The softer matrix which is formed of the same alloy system as the Laves phase may be a substantially pure metal, a solid solution, one or more intermetallic compounds which may form, or a mixture of solid solution and intermetallic compounds, so long as the matrix is softer than the Laves phase present therein. Preferably the matrix has less than one-third the Knoop hardness of the Laves phase, especially where a deformable coating is required. Generally, there will be no substantial mitigation of brittleness obtained where the matrix has more than about 90% of the Knoop hardness of the Laves phase therein.

A better understanding of the invention will be gained from the following detailed description and the drawings in which.

The drawings illustrate the structure of articles involving a metal base, a protective alloy coating metallurgically bonded to said metal base, wherein the surface layer of said alloy coating contains from about 30 to 85 v/o Laves phase and from 70 to 15 v/o softer matrix.

Figure 1:
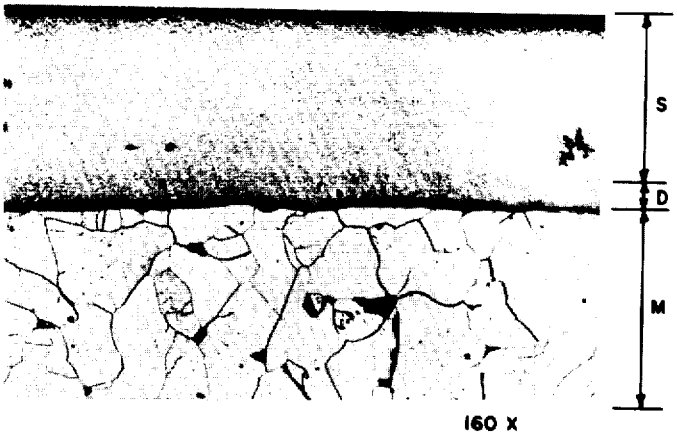
FIG. 1 is a photomicrograph (160×) of a nital-etched cross section through the coating on a mild steel metal base (M) coated with a 51 w/o W-40 w/o Ni-9 w/o Si coating alloy of the invention.
Figure 2:
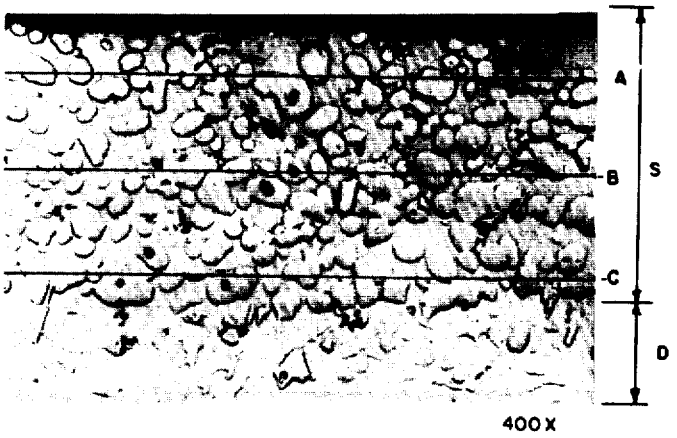
FIG. 2 is a photomicrograph (400×) of a nital-etched cross section through the coating on a mild steel base coated with a 35 w/o Mo-55 w/o Ni-10 w/o Si coating alloy of the invention.

As is evident from FIGS. 1 and 2, the metallographic detail of the structure of the articles may vary considerably, especially in the surface layer of the coating (S) and the layer of the coating (D) between the surface layer and the bulk of the metal base (M). FIGS. 1 and 2 show coatings wherein the surface layer thereof consists of hypereutectic alloy, i.e., an alloy consisting essentially of excess Laves phase and a lower melting matrix. In FIG. 1, the Laves phase occurs mainly as a skeleton structure of interconnected grains interpenetrated by the matrix. In FIG. 2, the Laves phase occurs partly as dispersed nodular grains and partly as interconnected nodular grains. The nodular Laves phase grains are believed to result from partial solution of Laves phase grains in the deposited coating alloy during formation of the alloy coating; a portion of which apparently interconnects by liquid sintering.

The term "surface layer" as used herein is intended to refer to the outermost portion of the coating, constituting at least one-third of the coating, bounded on the outside by the surface of the coating and on the inside by the imaginary surface nearest the surface of the coating and parallel thereto that intersects alloy containing not more than 30 v/o Laves phase.

The determination of volume percentages of Laves phase and matrix in the surface layer of the coating is made from a photomicrograph, at least 400×, that clearly shows the outlines of the grains of Laves phase in a representative cross-section of the coating taken generally normal to the surface of the coating. The section photographed is polished and etched. The area of the photomicrograph selected for measurement extends over the full thickness of the surface layer for a distance generally parallel to the coating surface twice this thickness but in no event is said distance less than 10 mils on the actual coating. A thin line generally parallel to the surface of the coating is drawn at the middle of each of three equally wide bands parallel to the surface of the coating into which the surface layer within the measurement area can be divided. The fraction of the length of each of these three lines lying over particles of Laves phase is measured. The three fractions are averaged arithmetically. The average is multiplied by 100 and taken as being equal to the volume percent of Laves phase present in the surface layer of the coating. The volume percent of Laves phase present in the surface layer of the coating is subtracted from 100, and the remainder is taken as being equal to the volume percent of matrix present in the surface layer of the coating. Referring to FIG. 2, an illustration of utilizing the above-described technique may be gained by reference to lines A—A, B—B, and C—C. By averaging the fractions of these lines (0.76, 0.55, and 0.65) transversing Laves phase grains, it is determined that the surface layer of the coating of this article contains 65 v/o Laves phase and 35 v/o matrix.

The layer of the coating (D) between the surface layer and the bulk of the metal base may vary in thickness. This portion of the alloy coating is constituted of less than 30 v/o Laves phase and, for the coated articles shown in FIGS. 1 and 2, is a diffusion zone frequently including part of the metal base. The diffusion zone forms a continuous metallurgical bond between the surface layer of the coating and the underlying base metal.

Other alloy coatings of various compositions suitable for the purposes of the invention on a metal base exhibit a variety of grain shapes, grain sizes, and diffusion layer thicknesses, depending on the crystal habit and conditions of formation of the coating; it being understood that the foregoing drawings merely illustrate certain structural embodiments of the invention and in no way are to be considered limiting the invention.

The presence of a softer matrix in the proportions specified for the surface layer of the coating provides multiaxial support for the Laves phase and greatly mitigates the inherent brittleness of the Laves phase. Although the unique coating structure of the invention present on metal bodies of ferrous base metals, nickel base metals, and cobalt base metals exhibits some definite ductility which is surprisingly superior to what would be available with a continuous layer of Laves phase formed on the same base metal, the actual degree of ductility of particles of the invention obviously will depend in large part on the composition of the alloy coating of the article. For example, alloy coatings of the Mo-Ni-Si system constituted, in the surface layer of the coating, essentially of Laves phase and a softer matrix of solid solution of the other elements in nickel can undergo extensive plastic deformation without fracture, particularly at low proportions of Laves phase and high proportions of matrix within the range of limits defined for the invention, owing to the exceptionally high ductility of these solid solutions forming the matrix. Nickel confers its ductility on alloy coatings having a nickel-rich solid-solution matrix, for example, in the W-Ni-Si, Mo-Cr-Ni-Si, and other coating alloy systems suitable for the invention. Formable metal bodies having the more ductile alloy coatings metallurgically bonded thereto can be shaped without disruption of the coating even with coating thicknesses up to 20 mils or more. These coatings, therefore, are highly useful on both thick, rigid metal bodies and flexible metal bodies. The ductility of such alloy coatings is enhanced by decreased proportions of Laves phase relative to the softer matrix, by decreased hardness of the matrix relative to the Laves phase, and by occurrence of the Laves phase in discrete nodular grains. On the other hand, such alloy coatings are made less ductile by increased proportion of Laves phase relative to the softer matrix, by increased hardness of the matrix relative to the Laves phase, and by occurrence of the Laves phase as interconnected grains. An outstanding feature of the invention, therefore, is the adaptability of the articles hereof to the requirements of different end uses. Obviously, the coating thickness of the articles of the invention may vary between wide limits depending on various of the considerations discussed hereinabove. Normally, in order to gain a significant degree of improvement in one or more of the properties of wear, abrasion, oxidation, or corrosion resistance, the coating thickness should be at least one mil thick. Coatings in excess of 250 mils normally will not be required or desired for economical reasons although certainly such coatings are contemplated as falling within the invention.

A further characteristic of the coating of the invention is the ability of the Laves phase and the softer matrix of the alloy coating to coexist indefinitely in their mutual presence at elevated temperatures. Although such elevated temperatures are limited by the decomposition temperature of the Laves phase, they usually extend at least to the incipient melting point of the alloy coating. The surface layer of the alloy coating may contain material derived from the underlying metal base. The degree of dilution from such material is dependent in large part on the technique employed for metallurgically bonding the coating to the metal base, more particularly, on the temperatures and time of the coating process and also on the exposure of the finished article to elevated temperature during use. As with all alloy coatings metallurgically bonded on a metal body of different composition than the alloy coating, sufficiently long exposure at sufficiently high temperature alters the alloy coating composition by interdiffusion between the coating and the metal body. Despite the possibility of interdiffusion as explained above, the coated articles exhibit outstanding useful life at elevated temperature encountered in numerous applications particularly in comparison to the corresponding unprotected base metals.

Coating the articles involves preforming a coating alloy constituted essentially of Laves phase and matrix, said alloy having an incipient melting point below the melting point of the metal base; reducing the alloy to a powder, depositing the coating-alloy powder on the metal base; melting at least a part of the deposit of powdered alloy by heating to accomplish a metallurgical bond; and cooling the coated metal body at a rate that leaves the coating with a matrix softer than the Laves phase therein.

In carrying out the method, it has been found that the elemental components of the coating must be prealloyed prior to decomposition on the metal base and firing, to insure a coating which is pore-free and integrally bonded to the metal base. Use of the elemental components of the coating in powder form without being prealloyed results in coatings which frequently crack or even spall from the metal base.

Accordingly, in executing the method, a coating alloy constituted essentially of about 30–85 v/o Laves phase and about 70–15 v/o matrix and having an incipient melting point below the melting point of the metal base to be coated is first formed from predetermined proportions of the alloying elements. The present state of the art does not make it possible to reliably predict on purely theoretical grounds the kinds and proportions of elements to form such a coating alloy. However, reference to published constitution diagrams, where available, will give a first approximation of suitable coating-alloy compositions and serve as a guide for varying the relative proportions of the coating-alloy components to arrive at the volume percentages of Laves phase and of matrix for coating the metal bodies. Usually, some trial and error and testing of the finished coated metal bodies must be practiced to obtain in the coating of the finished coated metal body a surface layer constituted of the desired volume percentages of Laves phase and softer matrix.

As an example of the execution of the invention, let it be desired to form a coating on a pure iron base using a binary coating alloy according to the novel method of the invention. A Kubaschewski plot (the "energy ratio" defined as $H_s$(solute)/$H_s$(solvent) plotted against the radius ratio) is useful in predicting whether two elements will form a Laves phase. (See O. Kubaschewski, "The Physical Chemistry of Metallic Solutions and Intermetallic Compounds," Paper No. 3c H. M. Stationery Office, London (1959).) Reference to published binary constitution diagrams shows many alloy systems containing a Laves phase that forms with the primary solid solution of one element of the Laves phase in the other element of the Laves phase a eutectic melting below the melting point of both iron and the binary Laves phase. An alloy having a composition intermediate the terminal phases of the eutectic, i.e., intermediate the composition of the saturated primary solid solution and the composition of Laves phase nearest the primary solid solution, will, in such alloy systems, lie in a two-phase field constituted of the Laves phase and the primary solid solution. Using the well-known inverse lever-arm relationship, the composition of an alloy in such two-phase fields of such alloy systems constituted of about 30–85 v/o Laves phase and about 70–15 v/o primary solid solution can be readily selected, recognizing that the ratio of the volume percentages of the two phases are usually roughly equal to the ratio of the weight percentages and to the ratio of the atom percentages of the two phases constituting the selected alloy. Since Laves phases are generally hard and primary solid solutions are generally soft, these two-phase alloys will generally have a matrix softer than the Laves phase present in said matrix.

Figure 3:
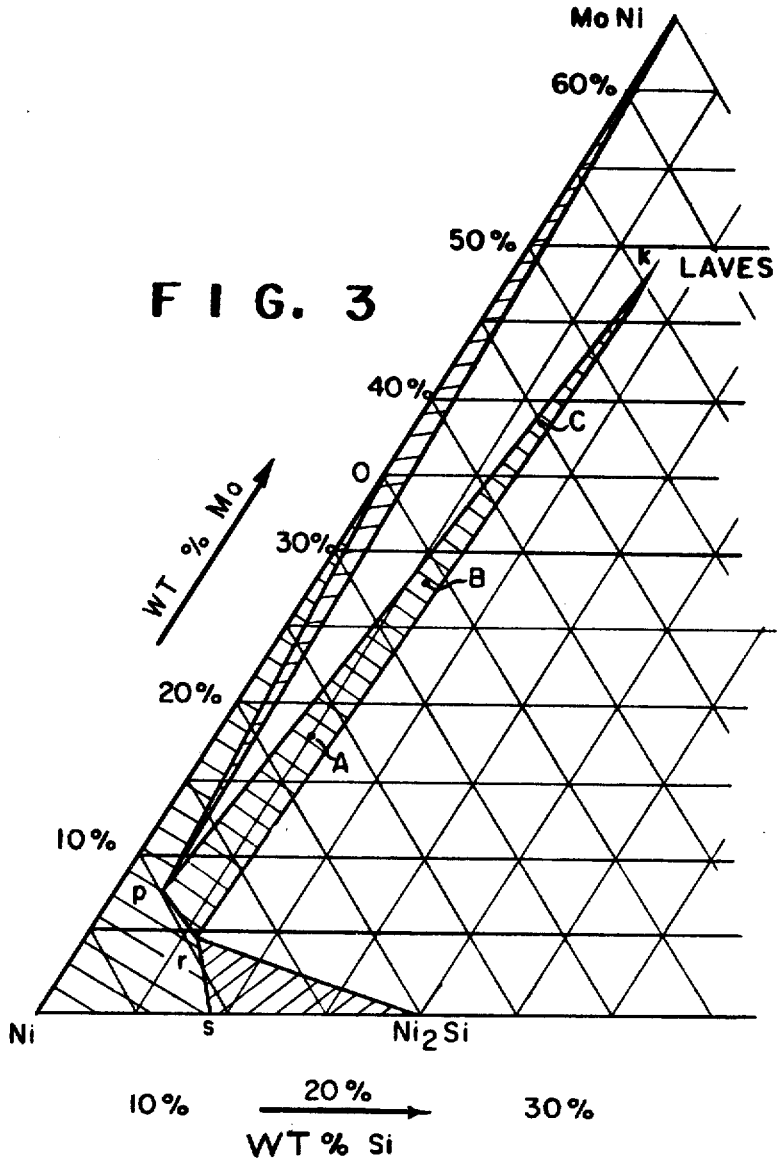
FIG. 3 is a fragment of a triangular constitution diagram of the molybdenum-nickel-silicon system showing the nickel-rich portion thereof.

As an example of the execution of the invention, let it be desired to select the composition of a molybdenum-nickel-silicon alloy for use in coating low-carbon steel according to the method disclosed previously. Reference to the published constitution diagram of the molybdenum-nickel-silicon system (H. Pfautsch, Zeitschrift für Metallkunde 17, 48–52 (1925)) given in FIG. 3 shows a two-phase field (kPr) occupied by saturated primary solid solutions of molybdenum and silicon in nickel and by the compound $Mi_3Mo_2Si$, a Laves phase $Mo(Ni_{1.5}Si_{0.5})_2$. Begin by selecting compositions A, B, and C, each constituted of different proportions of Laves phase, and saturated primary solid solution of molybdenum and silicon in nickel, from the slender triangular two-phase field kPr. The compositions are separately arc-melted, reduced to powder, and applied to test pieces of low-carbon steel base, and the resultant composites are fired at a temperature just sufficient to form a melt that wets the metal base and any unmelted Laves phase, according to the disclosed method. Although the firing can be continued until the coating alloy is completely melted, it is preferred to discontinue the firing while the coating alloy is in a partly melted, pasty condition, especially where a thick surface layer of coating undiluted by the base metal is desired. The test pieces are then furnace-cooled, and the coating on each is examined metallographically and by X-ray analysis to determine the structure of the coating. Attention is given to the volume percent and manner of occurrence of the Laves phase and the matrix in the surface layer of the coating, to the continuity of the metal lurgical bond between the coating and the metal base, and to the microhardness of the phases present. This examination is necessary because the volume percentages of Laves phase and matrix in the surface layer, the thickness of the surface layer and of the diffusion zone, and related characteristics of the coated metal are determined not only by the composition of the metal base and the starting composition of the coating alloys, but also by the temperature and time of firing. Less important factors that influence the structure of the coating on the metal base are purity of the coating alloy, particle size of the applied coating alloy, the method of application of the powdered coating alloy onto the metal base, and the furnace atmosphere, as will be appreciated by those skilled in the coating arts. Upon completion of the series of experimental coatings, a set of curves is made showing such information as the volume percent Laves phase in the surface layer of the coating, the thickness of the surface layer, the microhardness of the Laves phase and of the matrix, etc., plotted against coating-alloy composition. These data are used to match coating characteristics with application requirements.

Where constitution diagrams are not available for a ternary alloy system known to form Laves phase and suitable as an alloy coating for metal bodies, a guide to the selection of relative proportions of the alloying elements in order to obtain proportions of Laves phase and softer matrix falling within the limits sets for the alloy coating may be gained as follows.

A tie line is drawn on triangular coordinate plotting paper from the known or assumed composition of the binary Laves phase $AB_2$ across the diagram at constant percentage of the A-atom, plotting the compositions in atom percentages. Ternary Laves phases in the ternary alloy system will in general occur along this tie line and have a homogeneity range extending on both sides of it. Ternary Laves phases composed of two metals and a metalloid, such as silicon or germanium, usually contain not over about 33 a/o metalloid. A ternary Laves phase, such as $Mo(N_{1.5}Si_{0.5})_2$, may be stabilized by the metalloid, even though a Laves phase, such as $MoNi_2$, does not occur in the binary edge of the ternary diagram.

Some ternary alloys containing a Laves phase are suitable for application, according to the method described herein, to a metal base having a melting point above the temperature of incipient melting of the selected coating alloy. In order to select the compositions of potentially suitable coating alloys constituted of about 30–85 v/o Laves phase and about 70–15 v/o matrix for initial coating experiments, a second tie line is drawn from the estimated composition of ternary Laves phase to an apex of the ternary diagram, recognizing that the greatest probability of success will result from starting with a ternary Laves phase containing less than about 35 a/o of the third element not found in the binary Laves phase $AB_2$ and drawing the tie line to the B-atom apex of the ternary diagram. Preparation of the coating alloy and evaluation of the coating on the metal base is then carried out following the procedure described above.

Coated bodies having a surface layer of still more complex alloy constituted of 30–85 v/o Laves phase and 70–15 v/o matrix can be prepared using as a guide the fact that Laves phases are known in which the large (A) atom is partly substituted by two or more other kinds of metal atoms of comparable size and the small (B) atom is partly substituted by two or more other kinds of atoms, at least one kind being a metal atom, of comparable size to the B-atom.

The coating alloy is preferably formed by arc-melting the ingredients in a suitable container, such as, on a water-cooled copper hearth. The arc-melting is preferably accomplished under an inert atmosphere, such as, argon. As an illustration, for the 51 v/o W–40 w/o Ni–9 w/o Si alloy, found suitable as a coating composition for the invention, ¼-in. lumps of silicon are placed on the hearth, tungsten in the form of 1/16 × ¼-in. chips is placed over the silicon, and ⅛ to ¼-in. nickel shot are placed over the tungsten. When the arc is struck, molten nickel and molten nickel-tungsten alloy run through the charge and form a covering that dissolves silicon and minimizes volatilization of the silicon. The charge is solidified, turned over, and remelted as many as six times to insure a homogeneous alloy. Good results may also be obtained by melting the starting materials in an inert crucible under an inert gas blanket. The melt is then cooled in the crucible or cast into ingots of convenient size. Excessive temperature rise may result from reacting a large charge of alloy components containing silicon. This can be avoided, however, by progressive and stepwise addition of the components to an initial melt of the coating alloy in the crucible.

The coating alloy is then powdered by crushing and ball milling to a particle size suitable for the product being made. For making smooth coatings, a powder passing through a 140 mesh or even finer screen is preferred. For making rough coatings, powder made from coarse-grained coating alloy and passed through a 10-mesh, or even coarser, screen can be used. Where the alloy is so tough as to defy crushing, it is converted to chips in a machine tool with a metal carbide cutting tool. Ball milling of the crushed pieces or chips is carried out in a closed ball mill. It is preferable to employ a container made of plain carbon steel and a grinding medium of a metal carbide material, such as tungsten carbide, to avoid any contamination of the powder. Use of a porcelain container and silicious grinding medium produces a debris in the alloy coating powder which is found to result in porous coatings and incomplete metallurgical bonding of the coating to the base metal. It is preferable to limit ball-milling time to about one hour per batch in order to minimize contamination of the alloy coating powder as well as attrition of the equipment. This is made possible by reducing the alloy to pieces 1/16 in. or less in cross-section, ball-milling the pieces as described, separating the fraction of the charge having the desired size as product, and recycling the over-sized ball-milled material for additional ball-milling. It is a safety precaution to ball-mill the alloy under a blanket of inert gas or in the presence of enough liquid hydrocarbon, such as benzene, to thoroughly wet the powder formed. The dry product powder can be handled in the open air without detrimental reaction with oxygen or moisture; however, the powder should be stored in well-filled gas-tight containers. The coating alloy can also be made by other methods known in the art, such as directly from the melt by spray-cooling in an inert gas.

The powdered alloy coating composition is then deposited on the metal base by any suitable technique. Flame-spraying, plasma-jet spraying, and brushing, dipping, or spraying with a slurry of the powder in a solution of a temporary binder are satisfactory techniques. For flat surfaces it is preferred that the powdered coating composition be deposited on the metal base by means of a commercial plasma-jet gun, such as the Model F-40 gun made by Thermodynamics Corp., Lebanon, N.H. Preferably the metal base is cleaned prior to deposition of the coating composition, for example, by grit-blasting. The plasma-jet gun is supplied with dry alloy coating powder preferably in a size range minus 270 mesh plus 325 mesh. For deposition on the walls of holes, undercuts, and the like, that are not satisfactorily coated by the plasma-jet gun, it is preferred to employ a slurry of the powder by brushing or spraying with one or more coats. Such a slurry can be readily formed by mixing the coating-alloy powder having a particle size passing through a 140-mesh screen in a solution of an acrylic temporary binder dissolved in acetone or other inorganic solvent having suitable volatility.

Firing of the metal base having a deposit of coating alloy is preferably carried out by heating the work in argon at a pressure of 10 mm. Hg is an electric furnace. Alternatively, the article can be heated in an electric vacuum furnace at an air pressure of 0.001 mm. Hg. The article may also be fired in an electric furnace filled with hydrogen at a pressure slightly above atmospheric pressure, but in such a procedure the hydrogen should have a low content of water to insure a good metallurgical bond between coating and substrate. The dew point of the hydrogen preferably is reduced to minus 45° F.

It is essential in the above firing technique that the deposit of the alloy coating on the metal base be heated until a melt forms and spreads over the surface of both the metal base underlying the deposit and any unmelted part of the coating alloy. The matrix of the preformed coating alloy melts immediately when heated to its incipient melting point, and rapid heating to this temperature level is preferred since it minimizes the time needed to form sufficient melt for formation of the product article. Furthermore, rapid heating to the incipient melting point of the matrix insures metallurgical bonding of the coating to the base metal with minimum damage to the inherent physical properties of the metal base caused by overheating. It is preferred to discontinue the firing while the coating is a semi-fluid mixture of melt and unmelted residue of the deposited powder. Moreover, the time firing is continued after the first appearance of melt affects the relative thickness of the diffusion zone and the surface layer of the coating. Prolonged firing causes sufficient dilution of the alloy present in the diffusion zone to result in a reduction in the amount of Laves phase in the diffusion zone, adjoining the surface layer of the coating. The optimum time of firing the product article will obviously vary depending on the coating alloy selected, the relative amounts of Laves phase and matrix present in the coating, and the characteristics of the base metal involved. As an illustration, however, it has been found that the firing of deposits of various powdered coating alloys on chunky 2-lb. steel bodies can be completed at 1250° C. within approximately 5 min. after the first appearance of melt on the base metal.

The cooling technique for the fired article is dependent largely on the intended end use of the finished article as well as the metallurgical characteristics of the initial base metal. Furnace-cooling of the article provides, in the surface layer of the coating, a matrix softer than the Laves phase. Rapid quenching or other heat-treatment techniques, for purposes well appreciated in the prior art, may also be practiced if desired.

Other coating techniques can be operated if desired to form the coated articles. One such technique which may be successfully adapted to form the articles, particularly clad sheets and slabs, is cladding either by hot-rolling, by high energy impaction, or by simply heating a close-fitting assembly of a piece of coating alloy and a metal body in inert atmosphere or dry hydrogen to about the incipient melting point of the coating alloy until their contacting surfaces autogenously braze together. However, added brazing metal and flux may be employed; added brazing metal is necessary where the brazing temperatures used are substantially below the incipient melting point of the cladding alloy in contact with the metal base. In each of the cladding methods, the clad metal body is cooled at a rate that leaves the matrix of the protective cladding softer than the Laves phase therein or is otherwise heat-treated by conventional methods to produce this result in combination with desired properties of the metal base itself. To employ this technique, the starting materials for the desired coating alloy are melted together to insure formation of a homogenous coating alloy. The more-ductile alloys are formed by conventional methods into sheets of the size and thickness that gives the desired coating of the finished article. This clean sheet is then superimposed on the clean metal base and the composite is hot-rolled to obtain a metallurgical bond between the base metal and the coating alloy. The less-ductile coating alloys are preferably formed by casting and machining to the desired shape and size and then brazing the casting to the metal body as described. The finished article formed by this coating technique will contain, in the manner explained hereinabove, a diffusion zone comprising part of the alloy coating intermediate the surface layer of the alloy coating and the bulk of the base metal. Formation of articles by cladding is best employed for coating alloys which possess high inherent ductility.

Another technique which may be employed to form the coated articles is by hot dipping the metal base into a molten bath of the coating alloy. This method is particularly adaptable where the metal base to be coated has a uniform cross section such as round wires, rods, and bars.

Where the articles are not intended for high temperature use, the article may be formed by resin bonding the coating alloy to the base metal. In forming the article in accordance with such a technique, the coating alloy is preformed as a homogenous alloy in the shape and size desired as the coating of the article. Thin sheets of coating alloy are made in the manner previously described for the cladding technique whereas special shapes are made by conventional metal-working methods. The coating is then bonded to base metal by means of an adhesive, such as an epoxy resin or a vinyl-acrylic polymeric binder. The article formed in this manner, of course, does not have a diffusion zone and the coating is not metallurgically bonded to the substrate. Nevertheless, the bond between coating and substrate is adequate for nearly all end uses, with the possible exception of uses calling for extended service at high temperatures or exposure of the adhesive to solvent or chemical environments which might cause degraduation of the adhesive followed by loss of good bond between coating and substrate.

The following examples illustrate the preparation of preferred articles wherein the alloy coating is metallurgically bonded to the metal base both by the method described in column 2 and also by cladding. For the sake of brevity, the metal base is largely limited in these examples to ferrous base metals. It is to be understood, however, that the same coatings and other coatings within the invention can be readily formed on other metal bases as well.

Example 1

A coating alloy consisting of 51 w/o W–40 w/o Ni–9 w/o Si was formed by arc-melting weighed amounts of the component elements in argon at a pressure of 700 mm. Hg. The coating alloy contained about 45 v/o of Laves phase which was identified in the alloy by X-ray diffraction; the matrix melted incipiently at about 1300° C. The alloy was crushed and ball-milled to a powder in the size range minus 270 mesh plus 325 mesh, and the powder was deposited by plasma-jet gun on ⅛-in. and ¼-in. plates of S.A.E. 1020 mild steel. The resulting coated specimens were fired 3 min. at 1180° C. in a vacuum electric furnace at a pressure of about 0.001 mm. Hg and were furnace-cooled. The surface layer of the finished coating was about 11 mils thick. Laves phase was identified in the surface layer of the coating of the formed article by X-ray diffraction, the relative amounts of Laves phase and matrix being approximately 48 v/o and 52 v/o, respectively. In the surface layer of the product article, the Laves phase showed a Knoop hardness of 630 and the matrix showed a Knoop hardness of 240. The coated steel (4 × 4 × ¼-in. plates) had excellent resistance to a spray of aqueous 20 w/o NaCl solution at 95° F. during 14 days' exposure.

Example 2

An extrusion die having a 0.187-in. land and a throat diameter of 0.867 in. at the land was made of H–13 tool steel (5 w/o Cr, 1.5 w/o Mo, 1.0 w/o V, 0.35 w/o C, bal. Fe). A coating alloy consisting of 51 w/o W–40 w/o Ni–9 w/o Si was made by arc-melting and was reduced to powder. The powdered alloy was deposited to a depth of 24 mils on the land and working face of the die by plasma-jet gun. The resulting coated die was fired 20 min. at 1180° C. in an electric furnace at a pressure of $10^{-3}$ mm. Hg and was cooled in the furnace. The fired coating was about 20 mils thick. After the coated die was tempered for one hour at 610° C. and furnace cooled, which heat-treatment was repeated, the hardness of the H–13 steel was $R_c$ 49. The throat of the die was then finished to 0.850 in. diameter by Elox machining followed by grinding and polishing. In the finished die, the land had 11 mils of coating, including 8–9 mils of surface layer consisting of approximately 50 v/o Laves phase ($K_{100}$=900–1000) and 50 v/o of a softer matrix ($K_{100}$=600), and the coating was free of pits or cracks. The measured lattice parameters of the Laves phase (C–14 hexagonal crystal structure type) were a=4.731 A. and =7.546 A.

Twenty billets (9 in. diam. × 28 in. long) of cast aluminum alloy AA 6063 (0.7 w/o Mg, 0.4 w/o Si) were extruded through the preheated (400–430° C.) die at speeds up to 325 ft./min. into bars having good commerical finish. Oil dag lubricant was applied to the die before each extrusion. Under comparable conditions, extrusion through conventional uncoated steel dies was limited to about 175 ft./min.

Example 3

A coating alloy consisting of 35 w/o Mo–55 w/o Ni–10 w/o Si was formed, reduced to powder, and deposited on S.A.E. 1020 mild steel as in Example 1. The coating alloy contained about 50 v/o Laves phase having a Knoop hardness of 1040 and 50 v/o matrix having a Knoop hardness of 340. The matrix melted incipiently at about 1230° C. The coated base metal specimens were fired 3 min. at 1300° C. in a vacuum electric furnace at a pressure of 0.001 mm. Hg and were furnace cooled. The coating was metallurgically bonded continuously to the surface of the steel. By electron beam microanalysis, the surface layer consisted of 35 v/o matrix ($K_{100}$=200) composed of 2.3 w/o Mo–34.1 w/o Ni–60.6 w/o Fe–3.8 w/o Si and 65 v/o Laves phase ($K_{100}$=810) composed of 40.5 w/o Mo–21.7 w/o Ni–28.3 w/o Fe–9.2 w/o Si. The coated surface of the specimen was exposed to aqueous 10 w/o HCl at 50° C. for 10 days under static conditions. The coated surface corroded at a rate of 7.2 mils per month, whereas uncoated S.A.E. 1020 steel corroded at a rate of 396 mils/mo. under the same conditions.

Example 4

A shear-type extrusion die having a 0.184-in. land and a throat diameter of 0.864-in. was made of H–13 steel. A coating alloy consisting of 45 w/o W–40 w/o Co–15 w/o Si was made by arc-melting the elements in argon and was crushed and ball-milled to minus 400-mesh powder. One volume of powdered alloy was slurried in three volumes of 10 w/o solution of acrylic binder in acetone and was sprayed to a depth of about 14 mils onto the land and working face of the die. The resulting coated die was dried, preheated for 10 min. at 1100° C., fired 10 min. at 1200–1210° C. in an electric furnace at a pressure of about $10^{-3}$ mm. Hg. and cooled in the furnace. The fired coating was 7 mils thick as determined from the throat dimensions. After the coated die was tempered for one hour at 610° C. and furnace cooled, which treatment was repeated, the hardness of the H–13 steel was $R_c$47–49. The land was then ground to a throat diameter of 0.857-in. In the finished die, the land had 3.5 mils of coating, the surface layer of which contained approximately 38 v/o Laves phase ($K_{15}$=530) and 62 v/o of a softer matrix ($K_{15}$=240). The measured lattice parameters of the Laves phase (C–14 hexagonal crystal structure type) were a=4.708 A. and c=7.673 A.

Forty-five billets (9-in. diam. × 28-in. long) of cast aluminum alloy AA 6063 preheated to about 430° C.

were extruded through the preheated die (400–430° C.) at speeds up to 250 ft./min. into 130-ft. bars having good commercial finish and cross-sectional dimensions. Graphite-in-oil lubricant was applied to the die. The die was fit for further use. Extrusion of the same alloy through conventional uncoated steel dies, with an application of caustic solution after each push to clean the die, was limited to about 175 ft./min. when producing bars with comparable surface finish. Extrusion at 250 ft./min. using conventional uncoated steel dies and graphite-in-oil lubricant, instead of caustic solution, produced bars having inferior finish.

Example 5

An alloy consisting of 51 w/o W–40 w/o Co–9 w/o Si was made by arc-melting 510 g. of tungsten chips, 400 g. ⅛-in. cobalt shot, and 90 g. of lump silicon, all ingredients being at least 99.9% pure. The alloy was reduced to minus 140-mesh powder by crushing and ball-milling. One volume of the powder was slurried in three volumes of a 10 w/o solution of acrylic polymer in acetone. The slurry was brushed onto ⅛-in. thick pieces of S.A.E. 1020 steel and air-dried, leaving a deposit about 10 mils thick. The coated pieces were fired 3 min. at 1320° C. in a vacuum electric furnace and were cooled in the furnace. Laves phase was identified in both the coating alloy and the surface layer of the coating by X-ray diffraction; the surface layer containing approximately 64 v/o Laves phase ($K_{15}$=800–1040) and 36 v/o of a softer matrix ($K_{15}$=470). The measured lattice parameters of the Laves phase (C–14 hexagonal crystal-structure type) were a=4.721 A. and c=7.599 A. The coated steel was bent 15° around a ½-in. diameter pin at room temperature, placing the coating under tension, without cracking the coating. The coated steel was similarly bent 70°, but with the coating in compression, without cracking the coating.

Example 6

A coating alloy consisting of 35 w/o Mo–55 w/o Co–10 w/o Si was formed by arc-melting weighed amounts of the elements in argon at a pressure of 700 mm. Hg. The alloy contained 90 v/o of Laves phase in a matrix having an incipient melting point of about 1220° C. Laves phase was identified in the alloy by X-ray diffraction. The matrix appeared to be a mixture of phases and melted incipiently at 1220° C. The alloy was crushed and ball-milled in a steel mill to minus 400-mesh powder. A slurry of the powder in an acetone solution of acrylic binder was sprayed onto coupons of S.A.E. 1020 steel. When dried in the air, the deposit was 10–12 mils thick. The coupons were fired at 1225° C. for 10 min. in a vacuum electric furnace at a pressure of about $10^{-3}$ mm. Hg, and were cooled in the furnace. Laves phase and $Co_2Si$, the main constituent of the matrix, were identified in the surface layer of the coating by X-ray diffraction; the surface layer containing approximately 72 v/o Laves phase ($K_{100}$=1100) and 28 v/o of a softer, lower-melting matrix ($K_{100}$=340).

Example 7

A shear-type extrusion die having a 0.186-in. land and a throat diameter of 0.864-in. at the land was made of H–13 tool steel. A coating alloy consisting of 35 w/o Mo–55 w/o Co–10 w/o Si was made and applied to the die as in Example 2. The hardness of the H–13 steel in the tempered coated die was $R_c$50–51. After the land of the die had been ground to a throat diameter of 0.852-in., the finished die had 6 mils of coating; the surface layer of said coating containing approximately 72 v/o Laves phase and 28 v/o of a softer lower melting matrix.

Forty-six billets (9-in. diam. × 28-in. long) of cast aluminum alloy AA 6063 preheated to about 430° C. were extruded through the preheated die (400–430° C.) at speeds up to 250 ft./min. into 130-ft. bars having good commercial finish and cross-sectional dimensions. Graphite-in-oil lubricant was applied to the die, but the die was not cleaned. The die was fit for further use after this series of extrusions.

Under comparable conditions, extrusion through conventional uncoated steel dies, with conventional cleaning was caustic solution after each push, was limited to about 175 ft./min.

Example 8

A coating alloy consisting of 35 w/o Mo–55 w/o Co–10 w/o Si was made by arc-melting molybdenum chips, ⅛-in. cobalt shot, and ¼ to ½-in. silicon lumps, all at least 99.9% pure, and was reduced to powder, as in Example 1. The powder was pressed at room temperature under 50 tons/sq. in. pressure into a ¼-in. thick slab. The slab was sintered at 1220° C. for 10 min. in a vacuum electric furnace at a pressure of $10^{-3}$ mm. Hg, cooled in the furnace, and machined to a flat plate 0.203 in. thick. The clean plate was set on a flat clean surface of a piece of H-13 steel 0.760-in. thick, without added braze metal or flux, and the couple was fired in the same furnace at 1195° C. for 10 min., and then cooled in the furnace. Although the sharp corners of the silicon-alloy cladding were retained, sufficient liquid formed autogenously at the interface between the clad metal and the H-13 substrate to bond the two materials together. The materials were metallurgically bonded continuously over their entire contacting surface into an integral piece. This cladding material had exhibited a transverse rupture strength of 75,000 lb./sq. in. at room temperature and 99,000 lb./sq. in. at 800° C. When exposed to still air for 100 hrs. at 850° C., it changed 0.012 mg./sq. cm. in weight, indicating good resistance to oxidation. The product article had 203 mils of coating; the surface layer of said coating containing approximately 80 v/o Laves phase ($K_{100}$=1040–1230) and 20 v/o of a softer, lower-melting matrix ($K_{100}$=230–340).

Example 9

A coating alloy consisting of 44 w/o Mo-50 w/o Co-6 w/o Si was made and applied as a cladding to H-13 steel according to a procedure similar to that of Example 8. The cold-pressed slab was sintered at 1300° C. for 10 min., and the couple consisting of clad metal and H-13 steel was fired at 1280° C. for 10 min. The product article had 218 mils of coating; the surface layer of said coating containing 85 v/o Laves phase ($K_{100}$=1400) and 15 v/o of a softer, lower-melting matrix ($K_{100}$=420–520).

Example 10

A coating alloy consisting of 36 w/o Mo, 10 w/o Cr, 36 w/o Ni, 18 w/o Si was arc-melted, reduced to powder, and made into a slurry as in Example 5. A layer of coating about 20 mils thick was applied to a 1 × 1 × ⅛-in. coupon of S.A.E. 1020 mild steel and fired in a vacuum of $10^{-3}$ mm. Hg at 1190° C. for 10 minutes. The measured thickness of the surface layer was 11 mils after firing and contained 63 v/o Laves phase ($K_{100}$=950–1200) and 37 v/o matrix ($K_{100}$=253). Measured lattice parameters of the Laves phase crystal structure were a=4.732 A. and c=7.624 A. (C-14 hexagonal crystal structure type).

Example 11

A fifty-pound charge of coating alloy consisting of 35 w/o Mo, 58 w/o Ni, 7 w/o Si was induction-melted under an argon atmosphere and atomized into -140 mesh powder by tossing the molten metal from a spinning wheel and quenching the particles by an argon blast such that the particles froze with a generally spherical shape. A 15-mil coating was applied to a sample of pure cobalt plate (approximately ¼" thick) according to the procedure of Example 5. The composite was then fired in a vacuum furnace at 1220° C. for 3 min. at an air pressure of $10^{-4}$ mm. Hg and furnace-cooled. The resultant coating was 8 mils thick and was constituted of 80 v/o Laves phase (a=4.732 A.; c=7.622 A.; C-14 hexagonal crystal structure type) and 20 v/o matrix phase. The Laves phase microhardness value ($K_{100}$) was 1039, and the matrix microhardness valve was 370 under the same indentor load. The diffusion zone between the surface layer and the substrate was approximately one mil thick.

Example 12

A coating alloy consisting of 51 w/o W-40 w/o Ni-9 w/o Si made as described in Example 1 was applied to Udimet 700 (0.13 C, 0.08 Mn., 0.3 Si, 15 Cr, 3.0 Mo, 2.4 Cb, 2.2 Ti, 3.0 Al, 0.8 Fe, 29 Co, bal. Ni percent by weight) to a depth of 25 mils. The slurry was prepared and applied as outlined in Example 4. The resultant coating was dried, preheated for 30 min. at 1100° C., fired at 1230° C. for 2 min. in an electric furnace at an air pressure of $10^{-4}$ mm. Hg. The sample was cooled to 1150° C. slowly over a period of 16 min. and then furnace-cooled to room temperature in approximately 2 hrs. The heat-treated coating was 15 mils thick as determined metallographically. The thickness of the diffusion zone was less than 10 microns. The coating surface layer consisted of a finegrained (less than 10-micron particle diameter) Laves phase structure. Microhardness measurement of the individual phases was not feasible, because of the small interconnected grain structure. The composite microhardness value was $K_{100}$=889–1039 and the matrix $K_{100}$=330. Approximately 50 v/o of the structure was Laves phase and 50 v/o was the softer matrix phase. Electron beam microanalysis of the surface layer of the coating revealed the composition of the Laves phase to be 58.5 w/o W, 28.4 w/o Ni, 5.7 w/o Si, 0.7 w/o Fe, balance undetermined elements.

Example 13

Part of the coating alloy described in Example 11 was applied to unalloyed molybdenum (99.9+% Mo) using a plasma torch according to the procedure described in column 8 using a plasma torch supplied with 104 cu. ft./hr. of argon, 5 cu. ft./hr. of hydrogen, and 15 kw. of electrical power. The thickness of the unfired deposit of coating alloy was 10 mils. The composite of deposited coating alloy on molybdenum was then fired in a vacuum furnace at 1450° C. for 1 to 3 min. at a pressure of $10^{-4}$ Hg and was furnace-cooled. The resultant coating was 4 to 5 mils thick and was constituted of 85 v/o Laves phase and 15 v/o matrix phase in the surface layer. Microhardness of the Laves phase was $K_{100}$=870–965 and $K_{15}$=700, while the microhardness of the matrix was $K_{15}$=210. The molybdenum base was not recrystallized; its microhardness was $K_{100}$=253. The diffusion zone between the surface layer of the coating and the bulk of the molybdenum base was less than 10 microns. The coating was metallurgically bonded continuously to the molybdenum base.

It will be understood that additional combinations of elements comprising at least two metals in the elemental composition of each can also be used to form the coating of coated metal bodies. Likewise, coated metal bodies can comprise a metal base other than the metal bases shown in the examples. It will also be apparent that a minimum of about 6 weight percent (14 atomic percent) of silicon will be formed in the preferred embodiments disclosed in the examples. However, FIG. 3 would indicate that a minimum of about 3 weight percent silicon may also be used to obtain the improvements of the present invention.

As many apparently widely different embodiments of this invention can be made without departing from the spirit and scope thereof, the invention is intended to include all such embodiments as may be comprised within the following claims.

What is claimed is:

1. An alloy consisting essentially of a substantial amount of [at least one metal A] *tungsten* and a substantial amount of at least one metal B, and silicon [metal A being selected from the group consisting of molybdenum and tungsten and] metal B being selected from the group consisting of cobalt and nickel; the sum of the amounts of [metals A and] *tungsten and metal* B being at least 60 atomic percent of the alloy; the amount of silicon and the relative amounts of [metals A and] *tungsten and metal* B being such as to provide 30–85 volume percent of said alloy in the Laves phase; said Laves phase being distributed in a relatively soft matrix of the remaining 70–15 volume percent of said alloy.

2. An alloy as in claim 1 wherein said matrix is a primary solid solution.

3. An alloy as in claim 1 also containing chromium.

[4. An alloy as in claim 1 wherein said metal A is tungsten.]

[5. An alloy as in claim 1 wherein said metal A is molybdenum.]

[6. An alloy as in claim 1 wherein said metal B is nickel.]

7. An alloy as in claim 1 wherein said metal B is cobalt.

8. An alloy as in claim 1 wherein [said metal A is tungsten and] said metal B is nickel.

[9. An alloy as in claim 1 wherein said metal A is molybdenum and said metal B is nickel.]

[10. An alloy as in claim 1 wherein said metal A is tungsten and said metal B is cobalt.]

11. An alloy as in claim 1 containing at least about 3 weight percent silicon.

12. An alloy as in claim 1 containing at least about 6 weight percent silicon.

13. The alloy of claim 1 in powdered form.

*14. An alloy consisting essentially of a substantial amount of at least one metal A and a substantial amount of cobalt, and silicon, metal A being selected from the group consisting of molybdenum and tungsten; the sum of the amounts of metal A and cobalt being at least 60 atomic percent of the alloy; the amount of silicon and the relative amounts of metal A and cobalt being such as to provide 30–85 volume percent of said alloy in the Laves phase; said*

*Laves phase being distributed in a relatively soft matrix of the remaining 70–15 percent of said alloy.*

*15. An alloy as in claim 14 wherein said matrix is a primary solid solution.*

*16. An alloy as in claim 14 also containing chromium.*

*17. An alloy as in claim 14 containing at least about 3 weight percent silicon.*

*18. An alloy as in claim 14 containing at least about 6 weight percent silicon.*

*19. The alloy of claim 14 in powdered form.*

*20. An alloy consisting essentially of a substantial amount of molybdenum and a substantial amount of cobalt, and silicon; the sum of the amounts of molybdenum and cobalt being at least 60 atomic percent of the alloy; the amount of silicon and the relative amounts of molybdenum and cobalt being such as to provide 30–85 volume percent of said alloy in the Laves phase; said Laves phase being distributed in a relatively soft matrix of the remaining 70–15 volume percent of said alloy.*

*21. An alloy as in claim 20 wherein said matrix is a primary solid solution.*

*22. An alloy as in claim 20 also containing chromium.*

*23. An alloy as in claim 20 containing at least about 3 weight percent silicon.*

*24. An alloy as in claim 20 containing at least about 6 weight percent silicon.*

*25. The alloy of claim 20 is powdered form.*

* * * * *